Figure 1:
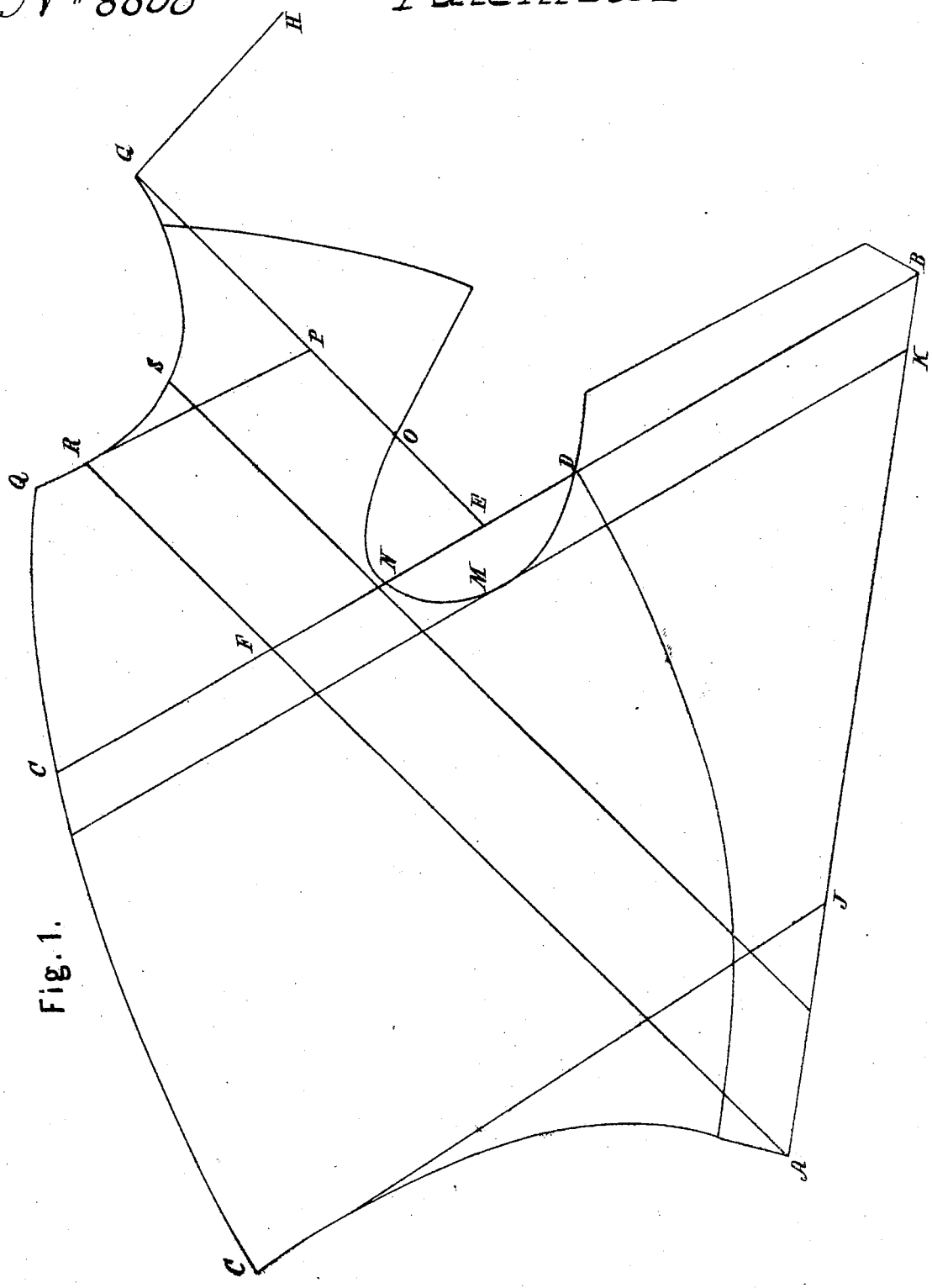
Figure 2:
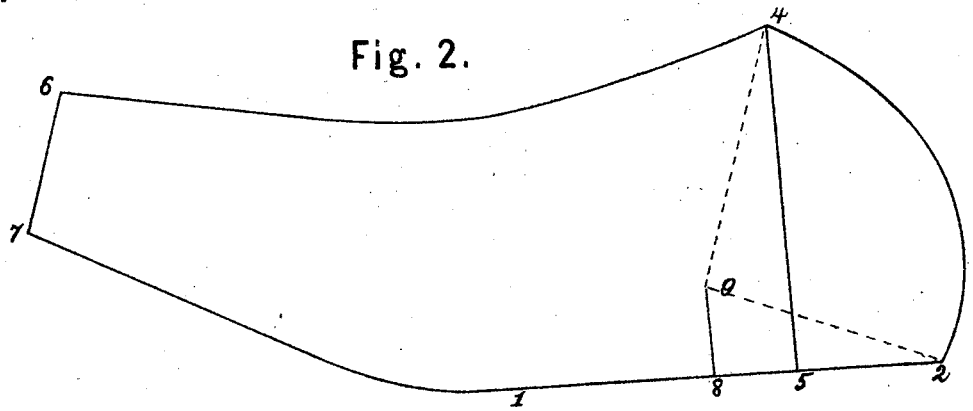
Figure 3:
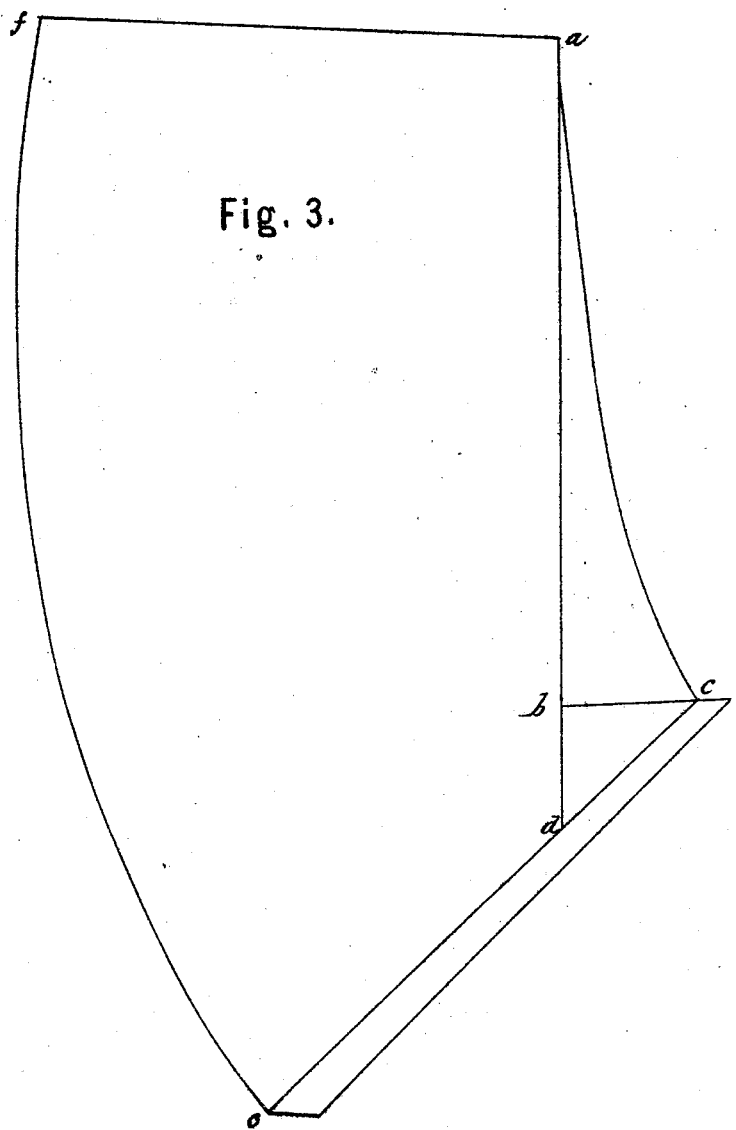

E. Virtue.
Tailoring.
Nº 8600   Patented Dec. 16. 1851.

UNITED STATES PATENT OFFICE.

EDWARD VIRTUE, OF PHILADELPHIA, PENNSYLVANIA.

TAILOR'S MEASURE.

Specification of Letters Patent No. 8,600, dated December 16, 1851.

*To all whom it may concern:*

Be it known that I, EDWARD VIRTUE, of Philadlephia, in the county of Philadelphia, the State of Pennsylvania, have invented a new and Improved Mode of Cutting Coats and Vests; and I do hereby declare that the following is a full and exact description thereof, reference being made to the accompanying drawings and to the letters of reference marked thereon.

The nature of my invention consists in proportioning all the measures of the body of coats and vests to the measure of the breast of the individual measured. The breast measure determines all the others except the sleeve measures and length of skirts.

To enable others skilled in the art to make and use my invention, I will proceed to describe my mode of cutting coats and vests.

First my mode of cutting a coat: I employ to take my measures the ordinary tailor's tape measure, and the Mahan protractor as it is called, for laying them down on the cloth. Having taken the back measure in the usual manner, *i. e.* the length of tape from the neck down the back to the cross seam or back tack as it is called—and the breast measure, I proceed thus (see diagram figure): First, lay off on a straight line A, B, the length of back measure. Second, draw a line B, C, making the angle A, B, C=51° or 14° on Mahan's protractor. Third, lay off B, C, equal to two thirds of the breast measure. Fourth, lay off B, E, equal one third of the breast measure. Fifth, lay off E, F, equal to one sixth of the breast measure. Sixth, lay of E, N equal to one twelfth of the breast measure. Seventh, at the point E draw E, G making the angle F, E, G, equal to 70° or 20° on Mahan's protractor. Eighth, make E, G, equal to one third of the breast measure. Ninth, at G, draw G, H perpendicular to E, G. Tenth, lay off on the line A, B, A, J equal to one sixth of the breast measure and make B, K, equal to one twenty fourth of the breast measure. Eleventh, B, and J, draw the lines J, L, and K, M parallel to B, C, that is making with A B an angle of 50° or 14° on Mahan's protractor. Twelfth, make J, L, equal one half of the waist measure. Thirteenth, on E, G, lay off E O equal to one twelfth of the breast measure. Fourteenth, on E, G, lay off O P,=one twelfth of the breast measure, and through P draw P, Q parallel to B, C; lay off P, R equal to one sixth of the breast measure and Q R=one fourth of P, R. Fifteenth, through the points O, N, M, and D draw a curve line which will make the sleeve hole or scye. Sixteenth, through the points L, C, and Q draw a curve line varied according to the taste and fashion of the time. Seventeenth, join the points Q and R by a straight line and through N draw N S parallel to F, R. Eighteenth, through the points R, S and G draw a curve line which makes the neck curve, where the collar is sewed on and draw A, L, a curved line leaving the back of width according to fashion and taste. This will furnish and determine all the measures for the body, collar and breast of the coat or vest—and to determine the sleeves I proceed as follows—see diagram—Figure II:

The line 1, 2 for the sleeve is drawn in the usual manner—then I proceed thus: First, from the point 2, lay off one twelfth of the breast measure and draw 5, 4, perpendicular to 1, 2 at the point so laid off. Second, make 5, 8, equal one twenty fourth the breast measure and draw 8, 9, perpendicular to 1, 2 and make it equal in length to one twenty fourth of the breast measure. Third, with the point 9, as a center and 9, 2, as a radius sweep an arc 2, 4, and that arc determines the point 4 where the curve line 2, 4 meets the perpendicular 5, 4. 4, 6, and 5, 7 are drawn in the usual manner of sleeves.

For the skirt of a coat see diagram—Fig. III: First, draw a straight line *a*, *b*, and lay off *a*, *b*,=one half of the waist measure. Second, draw *b*, *c*, perpendicular to *a*, *b* and make *b*, *c*,=one twelfth of the breast measure—hollow out the curve *a*, *c*, and make *b d*=*b c* and draw *c d e*. Third, lay off *c*, *e*, equal to the length of the back skirt, and through *e*, draw a curve *c*, *f*, to correspond with *a*. *c*.

The outlines above determined give the shape of the several parts of the vest or coat, which are chalked or marked on the cloth and then cut out in the usual manner.

The advantages which my mode possesses over the old mode, is that it economizes the material, secures a better fit, and is easily understood.

What I claim as my invention and desire to secure by Letters Patent is—

The mode of cutting coats and vests by making all the principal parts to depend in length on the length of the breast measure substantially as herein described.

EDWARD ✕ VIRTUE.
his mark.

Witnesses:
 GEO. HARDING,
 I. BILL MARTIN.